United States Patent [19]
Kaite et al.

[11] Patent Number: 6,016,046
[45] Date of Patent: Jan. 18, 2000

[54] BATTERY PACK

[75] Inventors: Osamu Kaite; Toshiharu Kokuga, both of Tsuna-gun; Shoichi Toya, Mihara-gun, all of Japan

[73] Assignee: Sanyo Electric Co., Ltd., Osaka, Japan

[21] Appl. No.: 09/118,178

[22] Filed: Jul. 17, 1998

[30] Foreign Application Priority Data

| Jul. 22, 1997 | [JP] | Japan | 9-195642 |
| Jul. 23, 1997 | [JP] | Japan | 9-196658 |

[51] Int. Cl.[7] .................................................. H01M 10/46
[52] U.S. Cl. ........................ 320/108; 320/113; 320/115
[58] Field of Search .................................. 320/108, 113, 320/115, 107, 125, 110

[56] References Cited

U.S. PATENT DOCUMENTS

| 3,418,552 | 12/1968 | Holmes | 320/115 |
| 3,510,747 | 5/1970 | Petrides | 320/108 |
| 3,840,795 | 10/1974 | Roszyk et al. | 320/108 |
| 3,885,211 | 5/1975 | Gutai | 320/108 |
| 4,647,831 | 3/1987 | O'Malley et al. | 320/113 |
| 4,912,391 | 3/1990 | Meadows | 320/108 |
| 5,536,979 | 7/1996 | McEaschern et al. | 320/108 |
| 5,550,452 | 8/1996 | Shirai et al. | 320/108 |
| 5,600,225 | 2/1997 | Goto | 320/108 |
| 5,680,028 | 10/1997 | McEachern | 320/108 |

*Primary Examiner*—Peter S. Wong
*Assistant Examiner*—Pia Tibbits
*Attorney, Agent, or Firm*—Wenderoth, Lind & Ponack, L.L.P.

[57] ABSTRACT

A battery pack comprises at least one rechargeable battery, a secondary coil which is magnetically coupled to a primary coil housed in a charging stand, and a control circuit which controls power induced in the secondary coil and charges the rechargeable battery. Alternating current (AC) generated in the secondary coil housed in the battery pack is controlled by the control circuit to charge the rechargeable battery.

22 Claims, 20 Drawing Sheets

BATTERY PACK

This application is based on No. 9-195642 filed on Jul. 22, 1997 and application No. 9-196658 filed on Jul. 23, 1997 in Japan, the contents of which are incorporated hereinto by reference.

BACKGROUND OF THE INVENTION

This invention relates to a battery pack which does not use electrical contacts for battery charging, but rather electrical power is transmitted by electromagnetic induction to charge rechargeable batteries contained within the battery pack.

A battery pack attaches in a detachable manner to a portable electrical device, and battery charging can be accomplished with the battery pack attached to the portable electrical device. For example, charging terminals may be exposed from the bottom surface of the attached battery pack. On the other hand, battery pack discharge terminals, which serve to connect the battery pack and the portable electrical device, are internal to the portable electrical device with battery pack attached. However, the portable electrical device attaches to a charging stand and the charging terminals must make electrical contact with supply terminals on that charging stand. Therefore, it is necessary to position the charging terminals where they will always be exposed. For this reason, the charging terminals can be exposed to extremely dirty environments, and this system has the disadvantage that electrical contact problems can easily occur. In particular, for charging stands to discriminate between battery pack types and optimize charging conditions, multiple charging terminals have become common. It is difficult to attach a multiple charging terminal battery pack to a charging stand without developing contact problems on any of the charging terminals. Detrimental effects such as rechargeable battery performance degradation can occur due to charging without good contact at all charging terminals. For example, if the type of rechargeable battery contained in the battery pack is mistaken and charging is performed with large currents, or if charging is performed without correct battery temperature readings, battery performance degradation can occur.

As noted, battery pack charging terminals are exposed when the battery pack is connected to the portable electrical device. Therefore, when portable electrical device is transported in a pocket or a carrying bag, problems such as short circuits can develop due to metallic objects or chains, also transported in the pocket or bag, contacting the charging terminals.

A portable electrical device and charging stand system which charges rechargeable batteries without contacts has been developed to eliminate these problems. In this type of system, a primary coil is housed in the charging stand, and a secondary coil is housed in the portable electrical device. The rechargeable batteries of the battery pack are charged by transmission of electrical power from the primary coil to the secondary coil by electromagnetic induction. The portable electrical device rectifies and converts to direct current (DC) the alternating current (AC) induced in the secondary coil. This DC power is controlled by a control circuit and supplied to the battery pack to charge the rechargeable batteries. The battery pack and portable electrical device are connected by charge-discharge terminals. When battery pack rechargeable batteries are being charged, the portable electrical device is attached to the charging stand. In this configuration, electric power is supplied from the primary coil in the charging stand to the secondary coil in the portable electrical device, secondary coil output is controlled by the control circuit, and power is supplied from the portable electrical device to the battery pack to charge the rechargeable batteries. When the portable electrical device is removed from the charging stand, the battery pack supplies electric power to the portable electrical device allowing it to be operated.

A portable electrical device, which contains a secondary coil and a control circuit, makes externally exposed charging terminals on the attached battery pack unnecessary. This system has the feature that battery pack rechargeable batteries can be charged without electrical contacts with the portable electrical device attached to the charging stand. However, in this type of charging system, the battery pack cannot be charged when it is removed from the portable electrical device. Therefore, this system has the disadvantage that a spare battery pack cannot be attached to the charging stand for charging while the portable electrical device is in use.

Further, in this type of system, it is also necessary to connect the battery pack to the portable electrical device via a control contact. If poor contact occurs at the control contact, it is impossible to correctly charge the rechargeable batteries. Poor contact at the control contact may make it impossible to safely charge the rechargeable batteries or may charge the batteries in a manner resulting in significant battery degradation. This is because the charging circuit housed in the portable electrical device cannot correctly determine battery pack conditions during charging.

This invention was developed to solve these types of problems. Thus it is a primary object of the present invention to provide a battery pack which can charge rechargeable batteries contained inside without provision of charging terminals.

Further, it is another important object of the present invention to provide a battery pack which eliminates improper charging caused by poor electrical contact, and which safely charges the rechargeable batteries contained inside under ideal conditions without battery performance degradation.

The above and further features of the invention will more fully be apparent from the following detailed description and accompanying drawings.

SUMMARY OF THE INVENTION

A battery pack contains rechargeable batteries. The rechargeable batteries are charged by setting a portable electrical device with battery pack attached in a charging stand, or by directly attaching the battery pack to the charging stand.

The battery pack has discharge terminals which are exposed through a case, but charging terminals for charging the rechargeable batteries are to provided. Discharge terminals electrically connect to power supply terminals on the portable electrical device when the battery pack is connected to the portable electrical device.

Electric power to charge rechargeable batteries contained in the battery pack is supplied from a primary coil housed in the charging stand. The primary coil of the charging stand supplies electric power to charge battery pack rechargeable batteries without electrical contacts, and is connected to a power supply circuit which produces AC for electromagnetic excitation.

The battery pack contains a secondary coil which is magnetically coupled to the primary coil housed in the charging stand, and a control circuit which converts secondary coil AC output to DC and controls rechargeable battery charging conditions.

AC power is magnetically induced from the primary coil to the secondary coil, and this AC power is controlled by the control circuit to charge the rechargeable batteries housed in the battery pack.

This battery pack configuration has the feature that battery charging can be performed without providing terminals for charging. This is because electric power generated by the secondary coil housed in the battery pack is controlled by the control circuit to charge the rechargeable batteries. Consequently, there is no requirement to supply charging power to the battery pack from portable electrical equipment, and rechargeable batteries can be charged by controlling, via the control circuit, electric power magnetically induced in the secondary coil housed in the battery pack. Therefore, it is not necessary to connect the battery pack to the portable electrical device via contacts for rechargeable battery charging. The battery pack charges rechargeable batteries to full charge while monitoring their state of charge with the control circuit housed within. A battery pack charged in this fashion does not require connection of charging terminals to the portable electrical device or to a charging stand, nor does it require connection of terminals to determine battery type or state of charge. The battery pack can charge rechargeable batteries under ideal conditions in a configuration completely free of electrical contacts.

Further, in the battery pack of the present invention, electric power is not supplied from the charging stand to the portable electrical device, and charging power is not supplied from the portable electrical equipment to the battery pack. Power is not routed from the charging stand to the portable electrical device, but rather charging power is supplied directly to the battery pack without electrical contacts using the action of electromagnetic induction. A battery pack charged under these conditions can be charged by the charging stand without intervention of the portable electrical device. Consequently, the battery pack can also be charged by direct connection to the charging stand without attachment to the portable electrical device. This system configuration realizes the convenient feature that a spare battery pack can be charged by the charging stand.

Furthermore, the battery pack of the present invention also realizes the feature that abnormal battery charging caused by poor charging terminal contact is eliminated, and rechargeable batteries can be charged safely under ideal conditions and without battery performance degradation. This is because the battery pack contains both a secondary coil and a control circuit, and electric power is magnetically induced in the secondary coil and controlled by the control circuit to charge the rechargeable batteries.

DETAILED DESCRIPTION OF THE INVENTION

Figure 1:
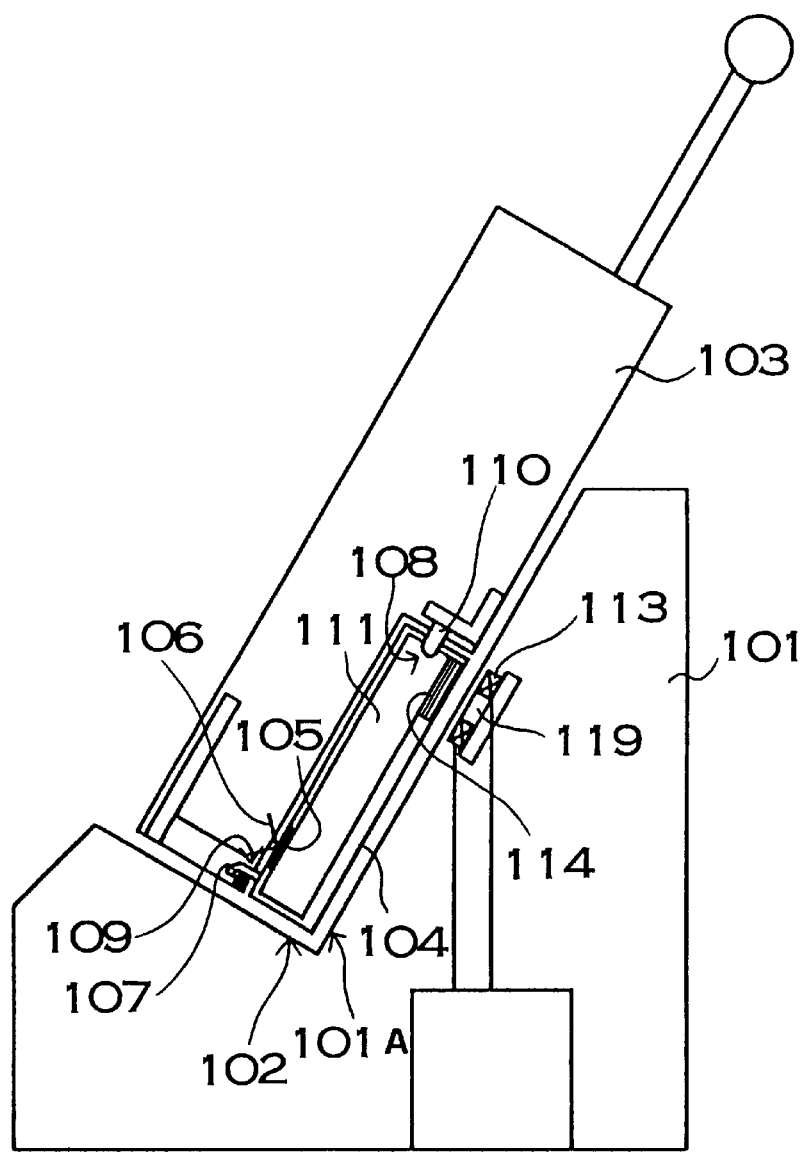
FIG. 1 is an abbreviated cross-section view of the portable electrical device and charging stand of an embodiment of the present invention.

Turning to FIG. 1, a battery pack 102 housing rechargeable batteries 111, the portable electrical device 103 with this battery pack 102 attached, and a charging stand 101 are shown. The portable electrical device 103 of this FIG. has the battery pack 102 attached to its backside in a detachable manner. The charging stand 101 has an attachment section 101A for attaching the portable electrical equipment 103 with battery pack 102 connected at a specific position. The portable electrical device 103 of FIG. 1 is a mobile telephone, however the present invention does not restrict the portable electrical device 103 to be a mobile telephone. For example, the portable electrical device may also be an electric shaver or an electric tooth brush or the like.

Electric power is supplied to the portable electrical device 103 from the battery pack 102. Therefore, the battery pack 102 has discharge terminals 105 exposed outside its case 104. The portable electrical device 103 has power supply terminals 106 which contact and make electrical connection with the discharge terminals 105 when the battery pack 102 is attached. The battery pack 102 of FIG. 1 has discharge terminals 105 exposed from a surface which mates with an attachment plane of the portable electrical device 103. The discharge terminals 105 provided here contact the power supply terminals 106 provided on the portable electrical device 103 when the battery pack 102 is attached to the portable electrical device 103.

The battery pack 102 is provided with locking projections 107 at the bottom edge of the case 104 and locking detents 108 at the top edge of the case 104. The locking projections 107 insert into locking locations 109 provided in the case 104 of the portable electrical device 103. Locking pieces 110 provided on the portable electrical device 103 insert into the locking detents 108 in a flexible fashion. This configuration of battery pack 102 is attached and detached to and from the portable electrical device 103 by moving the locking pieces 110 upward. The locking pieces 110 flexibly insert into the locking detents 108 and attach the battery pack 102 to the portable electrical device 103 in a manner that keeps it from falling off. This configuration of battery pack 102 can be easily attached and detached to and from the portable electrical device 103 by operation of the locking pieces 110. However, the present invention does not restrict the battery pack to portable electrical device attachment configuration to that described above, and any configuration which allows the battery pack to be freely attached and detached to and from the portable electrical device can be employed.

The battery pack 102 is not provided with charging terminals, and rechargeable batteries 111 are charged with electric power transmitted from the charging stand 110 by the action of magnetic induction. To transfer electric power by magnetic induction, the charging stand 101 contains a primary coil 113 and the battery pack 102 contains a secondary coil 114. The primary coil 113 and the secondary coil 114 are magnetically coupled, and electric power is transferred from the primary coil 113 to the secondary coil 114. To efficiently transmit power from the primary coil 113 to the secondary coil 114, the two coils 113 and 114 are positioned together as close as possible.

The primary coil 113 is disposed at the inside surface of the attachment plane of the charging stand 101. As shown in the circuit diagram of FIG. 2, the primary coil 113 is connected to a power supply circuit 115. The power supply circuit 115 is provided with a rectifying circuit 116 which converts the input commercial AC power to DC with diodes and into smoothed DC with a smoothing capacitor, a field effect transistor (FET) switching device 117 connected in series with the primary coil 113, and an oscillator circuit 118 which turns the switching device 117 on and off. The oscillator circuit 118 turns the switching device 117 on and off at frequencies, for example, of 50 kHz to 500 kHz, and preferably about 100 kHz. The switching device 117 switches the DC output from the rectifying circuit 116 to excite the primary coil 113 with AC power. As shown in FIG. 1, the primary coil 113 has a ferrite core 119 disposed at its center to efficiently transfer power to the secondary coil 114 by magnetic induction.

The battery pack 102 contains the rechargeable batteries 111, the secondary coil 114 magnetically coupled to the primary coil 113 of the charging stand 101, a control circuit 120 which converts secondary coil 114 AC output to DC and controls the charging state of the rechargeable batteries 111, and a protection circuit 121 which cuts off current and protects the batteries when they are used under abnormal conditions.

The battery pack 102 preferably contains lithium ion batteries as the rechargeable batteries 111. A lithium ion battery pack is light weight and has a large charge capacity. However, nickel hydrogen batteries or nickel cadmium batteries may also be used as the rechargeable batteries housed in the battery pack. They are characterized in that nickel cadmium batteries can discharge large currents and nickel hydrogen batteries have a large charge capacity per volume.

As shown in FIG. 1, the secondary coil 114 is positioned on the inside surface of the battery pack case 104 at the back side of the battery pack 102 in opposition to the primary coil 113 to locate it close to the primary coil 113 when the portable electrical device 103 is attached to the charging stand 101. To keep the battery pack 102 light weight, no core is provided for the secondary coil 114 so it has an air-core. However, a core may also be provided for the secondary coil for efficient power transmission by electromagnetic induction from the primary coil 113 to the secondary coil 114.

Figure 2:
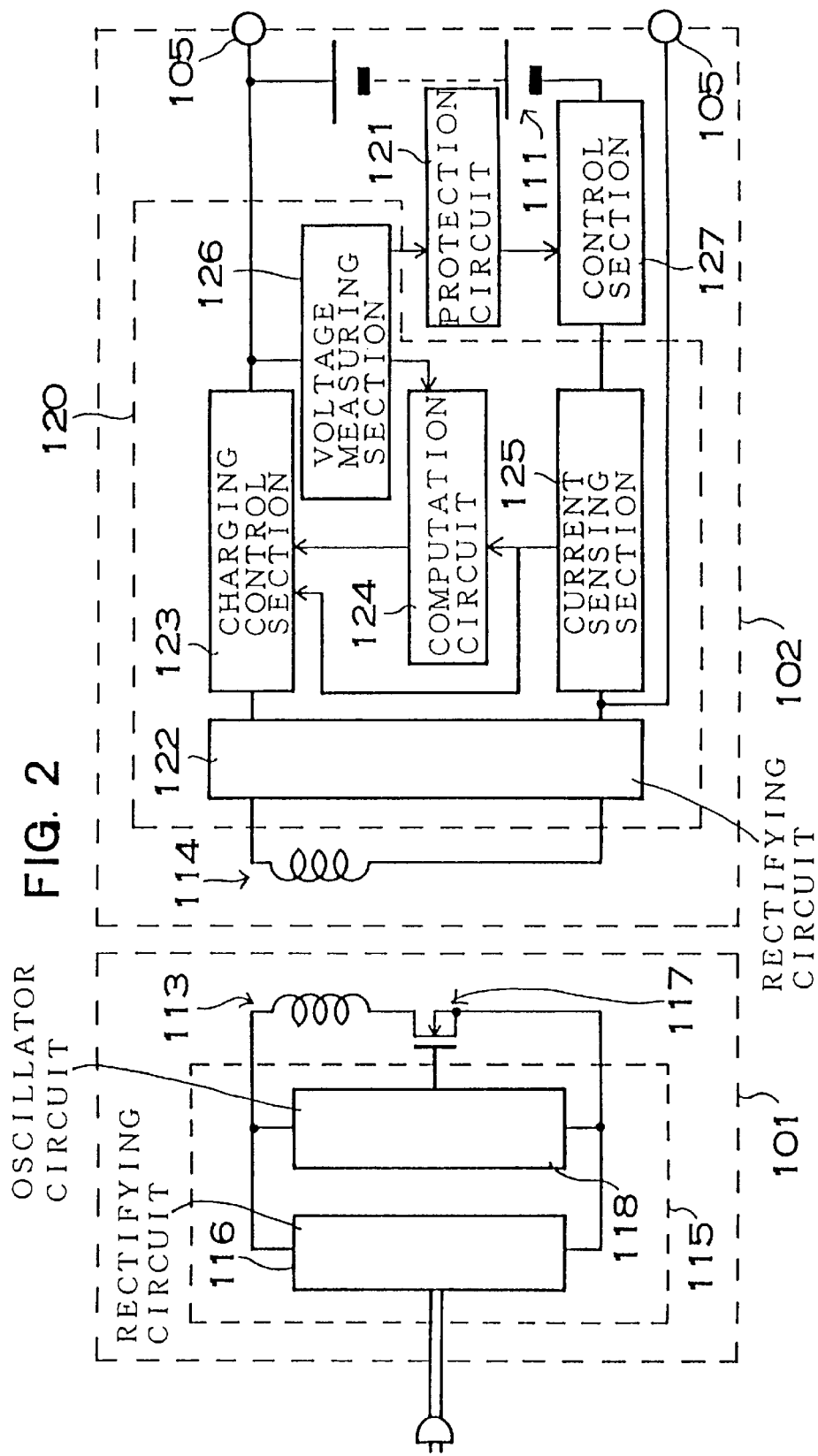
FIG. 2 is a circuit diagram of the battery pack attached of a portable electrical device and the charging stand of an embodiment of the present invention.

As shown in the circuit diagram of FIG. 2, the control circuit 120 is provided with a rectifying circuit 122 to rectify and convert AC output induced by the secondary coil 114 to DC, a charging control section 123 connected in series between the rectifying circuit 122 output and the rechargeable batteries 111 to control the charging state of the rechargeable batteries 111, a computation circuit 124 to control the charging control section 123, a current sensing section 125 to input rechargeable battery 111 charging current to the computation circuit 124, and a voltage measuring circuit 126 to input the voltage to the computation circuit 124.

The charging control section 123 controls rectifying circuit 122 output to voltage and current levels suitable for rechargeable battery 111 charging, and also stops charging when the rechargeable batteries 111 have reached full charge. Therefore, the charging control section 123 is provided with a constant current constant voltage circuit to stabilize output from the rectifying circuit 122, and a switching device to stop charging when the rechargeable batteries 111 reach full charge under control of the computation circuit 124. The constant current constant voltage circuit measures charging current and battery voltage to control the output to a constant current and constant voltage. The switching device is connected in series with the rechargeable batteries 111. Rechargeable batteries 111 are charged when the switching device is on and charging is stopped when the switching device is off.

The computation circuit 124 measures rechargeable batteries 111 charging current and battery voltage, and controls the switching device of the charging control section 123. The computation circuit 124 maintains the switching device in the on state until the rechargeable batteries 111 reach full charge, at which point the computation circuit 124 switches the switching device off to stop charging. Full charge of a lithium ion rechargeable battery can be detected by measuring charging current or battery voltage. A lithium ion rechargeable battery is charged to full charge initially by constant current charging and subsequently by constant voltage charging. During the constant voltage charging step, charging current gradually decreases as full battery charge is approached. Consequently, full battery charge can be determined by detecting when charging current drops below a specified value, and charging can be stopped at that point. Full battery charge can also be determined when battery voltage rises to a specified voltage, and charging can be stopped at that point.

Nickel hydrogen and nickel cadmium batteries are charged to full charge with constant current charging. These battery types have the property that battery voltage drops slightly as full battery charge is reached. Consequently, full battery charge can be determined by detecting a drop in battery voltage, namely DV.

The protection circuit 121 measures battery voltage and current flowing in the batteries to control, on and off, a control section 127 current shut-off device. The current shut-off device is, for example, a bipolar transistor or FET. If battery voltage becomes greater than a specified voltage, or less than a specified voltage, the protection circuit 121 turns the control section 127 current shut-off device off to cut-off battery current. In addition, when abnormally large currents flow in the batteries, the current shut-off device is also turned off to cut-off battery current.

The battery pack 102 of FIG. 2 is configured with a separate control circuit 120 and protection circuit 121. However, the capabilities of the protection circuit may also be included in the computation circuit of the control circuit allowing the control circuit to serve a dual function as protection circuit. In addition, the switching device of the charging control section may also serve a dual function as the protection circuit controlled current shut-off device. The computation circuit may be realized by analog circuitry to process analog signals such as voltages and currents and control the switching device, or it may be a microprocessor such as a one-chip microcomputer (or microcontroller). A microprocessor computation circuit converts voltages and currents to digital signals for computation with an analog to digital (A/D) converter.

Figure 3:
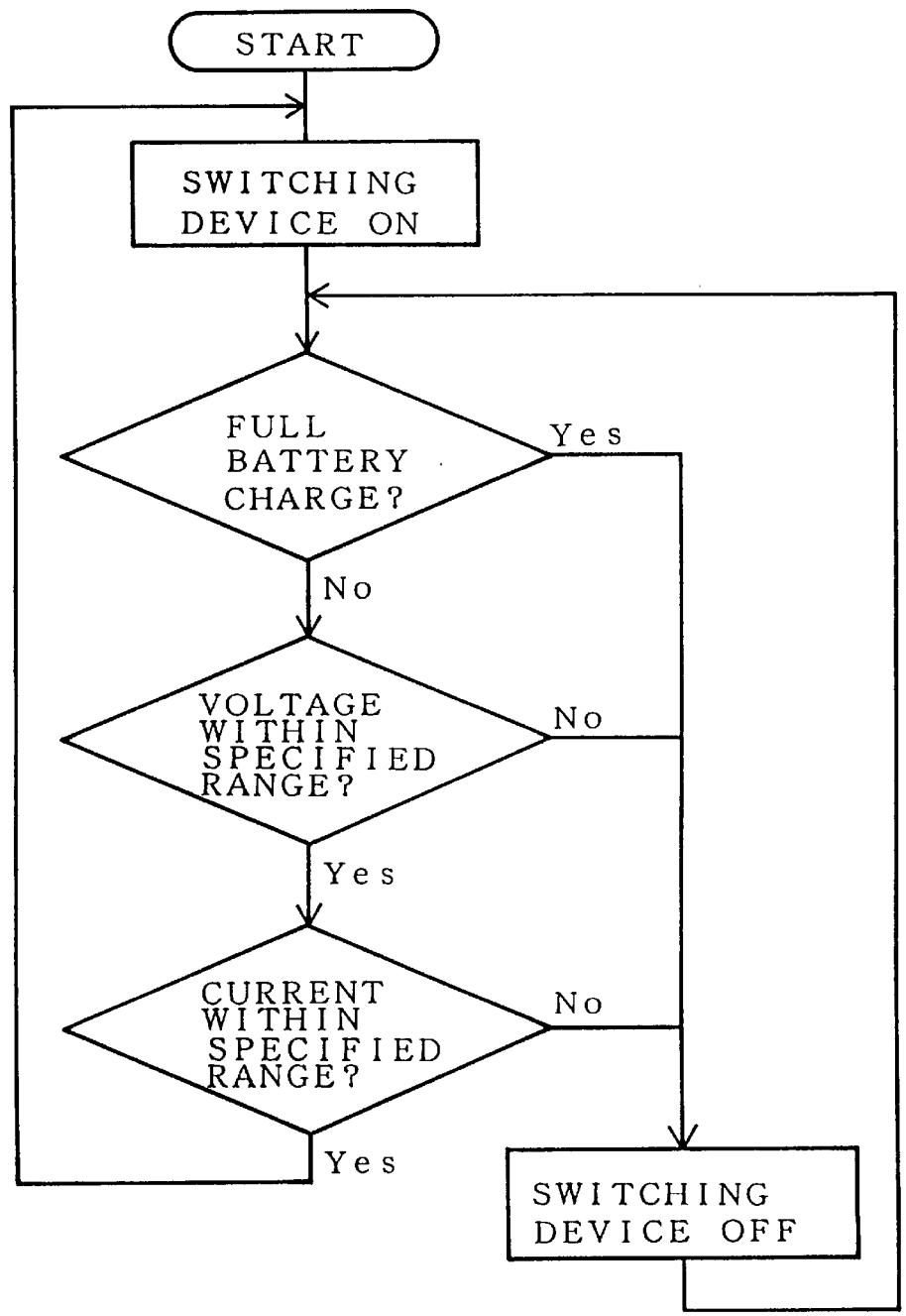
FIG. 3 is a flow-chart for a microprocessor computation circuit combining a control circuit and a protection circuit for another embodiment of the present invention.

A microprocessor computation circuit serving as both control circuit and protection circuit controls the switching device as shown in the flow-chart of FIG. 3. Turning to the flow-chart of FIG. 3, the microprocessor controls the switching device on only when the rechargeable batteries are not fully charged and battery voltage and current are within the specified range. The microprocessor controls the switching device to place it in the off condition when either the batteries have reached full charge, or battery voltage or current are outside the specified range.

Figure 4:
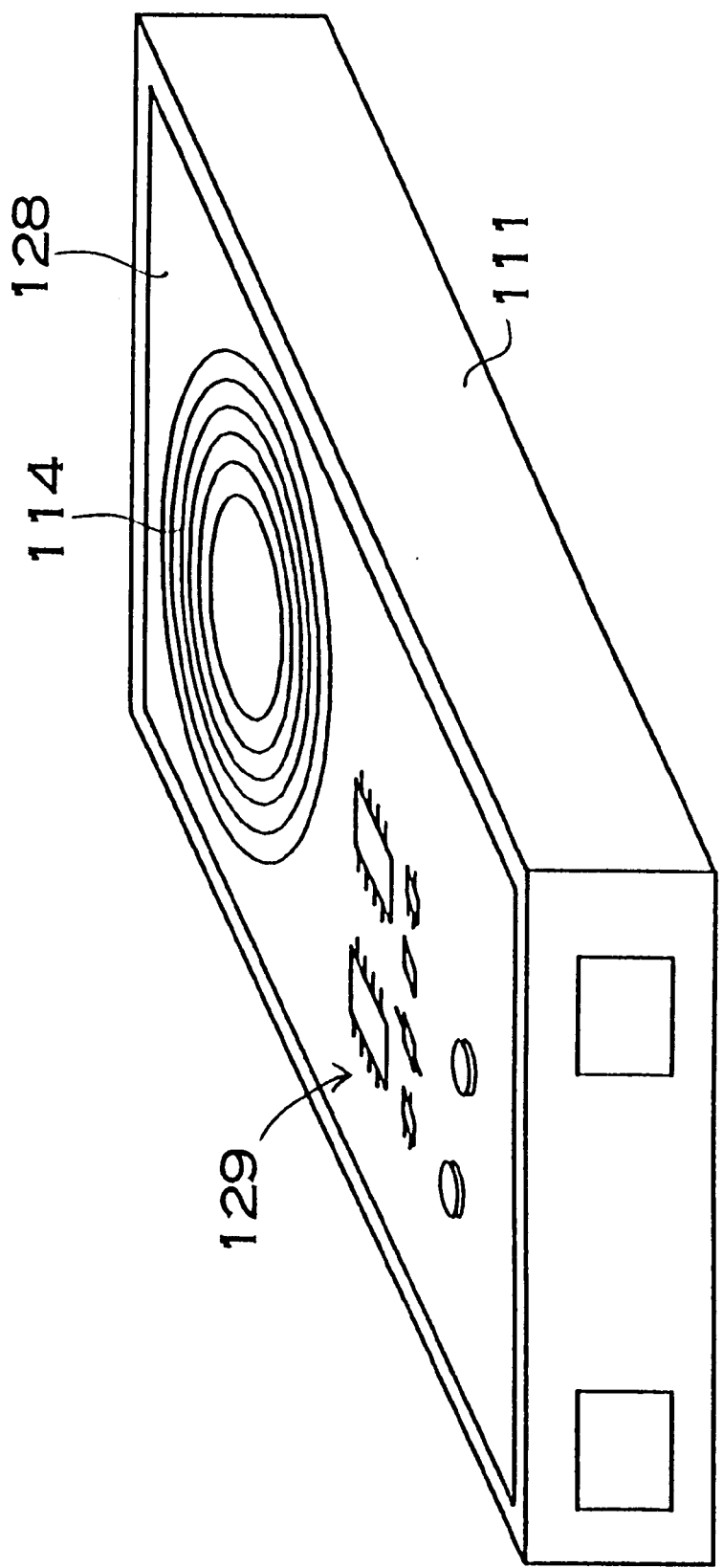
FIG. 4 is an enlarged oblique view showing internal structure of the battery pack.

FIG. 4 shows the internal structure of a battery pack which contains a secondary coil and circuitry such as a control circuit. The battery pack of FIG. 4 has a printed circuit board 128 disposed parallel to a rectangular rechargeable battery 111. In FIG. 4, the printed circuit board 128 has a secondary coil 114 attached to its surface on the right side and electronic parts 129 to implement the control circuit and protection circuit on the left side. The rechargeable battery 111 and printed circuit board 128 of this FIG. are inserted into a plastic case (not illustrated), for example, to make a battery pack. This type of internal structure is suitable for a battery pack with an overall thin rectangular shape.

Figure 5:
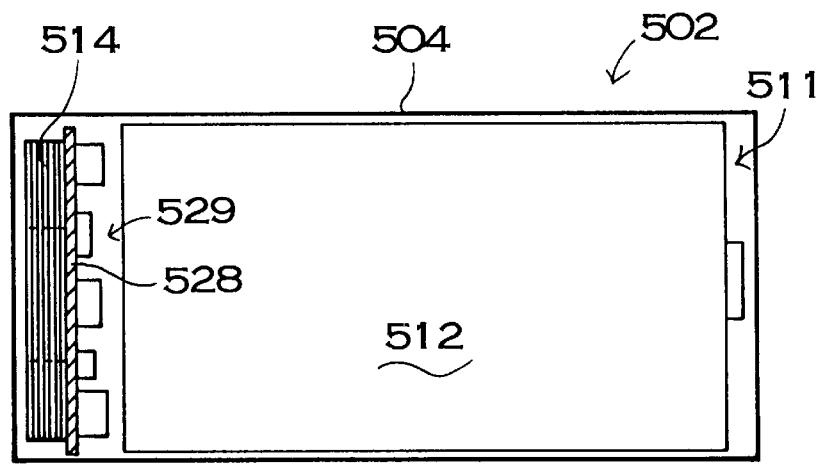
FIG. 5 is a cross-section view of a battery pack for another embodiment of the present invention.

As shown in FIG. 5, a battery pack may also contain a cylindrical rechargeable battery 511 and take on an overall cylindrical shape. This battery pack 502 has a printed circuit board 528, which has approximately the same outline as the cylindrical rechargeable battery 511, disposed at one end of the battery. The printed circuit board 528 has electronic parts 529 to realize circuitry such as the control circuit attached to the side facing the battery, and has a secondary coil 514 attached to the other side. A battery pack 502 with this shape has the feature that the secondary coil 514 which is wound in a circular shape can be contained within the battery pack 502 without wasting any space.

Figure 6:
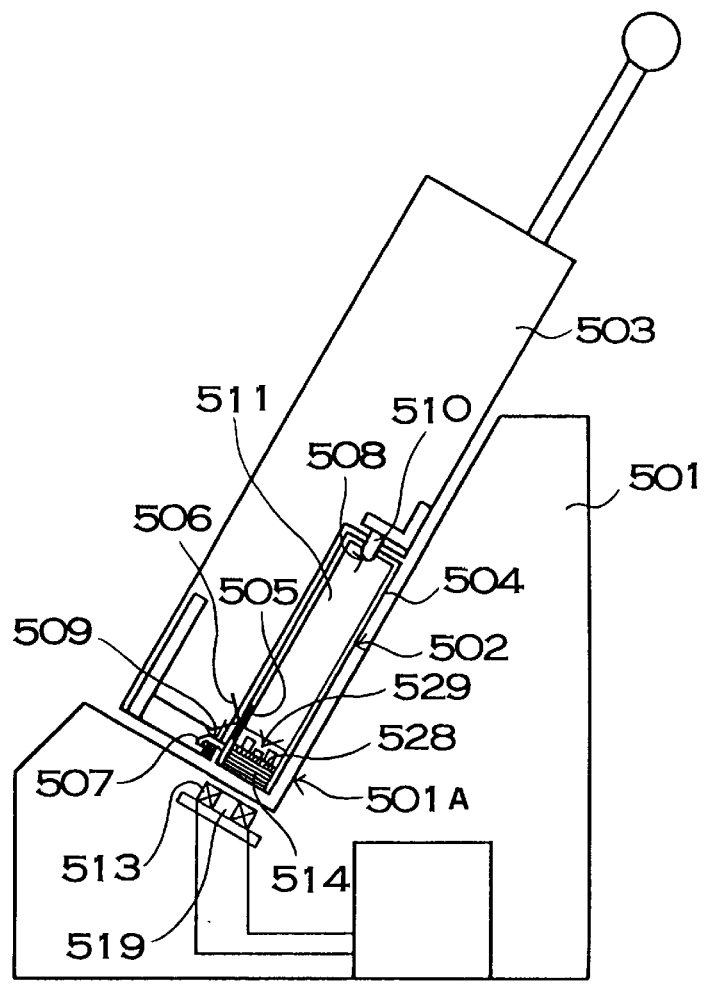
FIG. 6 is an abbreviated cross-section view showing the battery pack shown in FIG. 5 attached to a charging stand.

Turning to FIG. 6, the battery pack 502 of FIG. 5 attaches to a charging stand 501 housing a primary coil 513 with the surface of its secondary coil 514 facing that primary coil 513 to charge the rechargeable battery 511 contained within.

Figure 16:
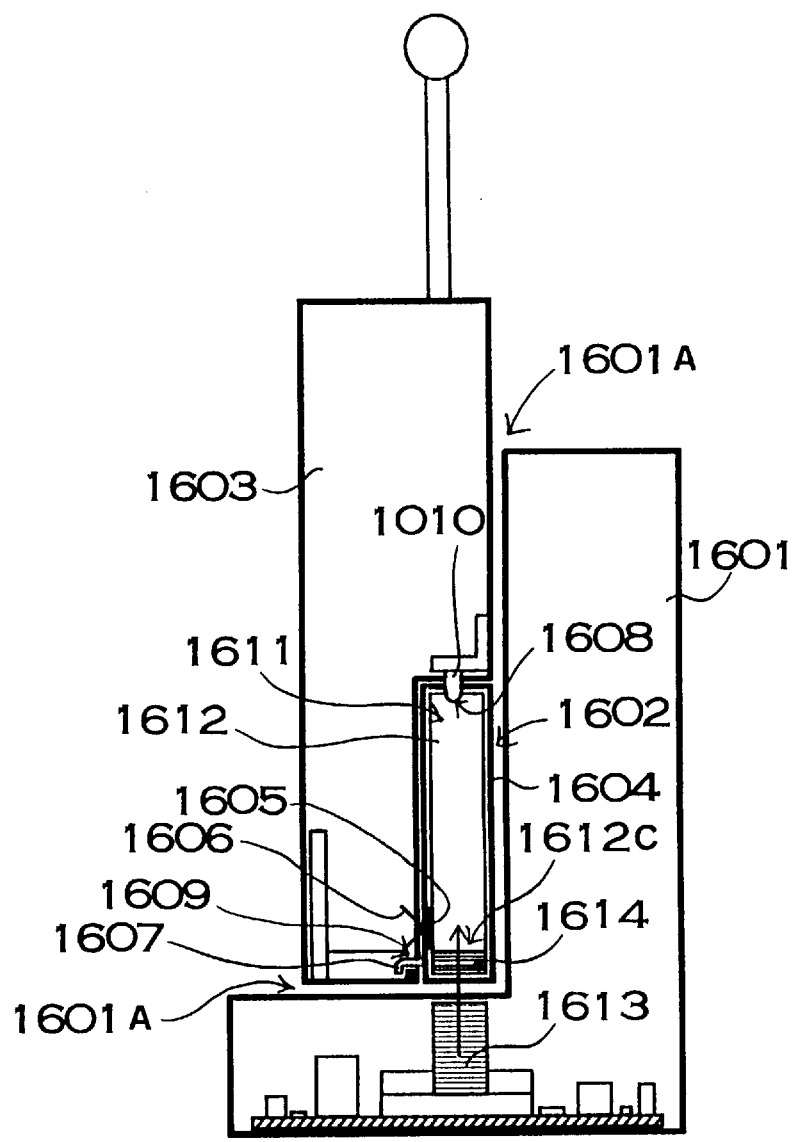
FIG. 16 is a vertical cross-section from the side of a charging stand and battery pack attached to that charging stand of an embodiment of the present invention.
Figure 17:
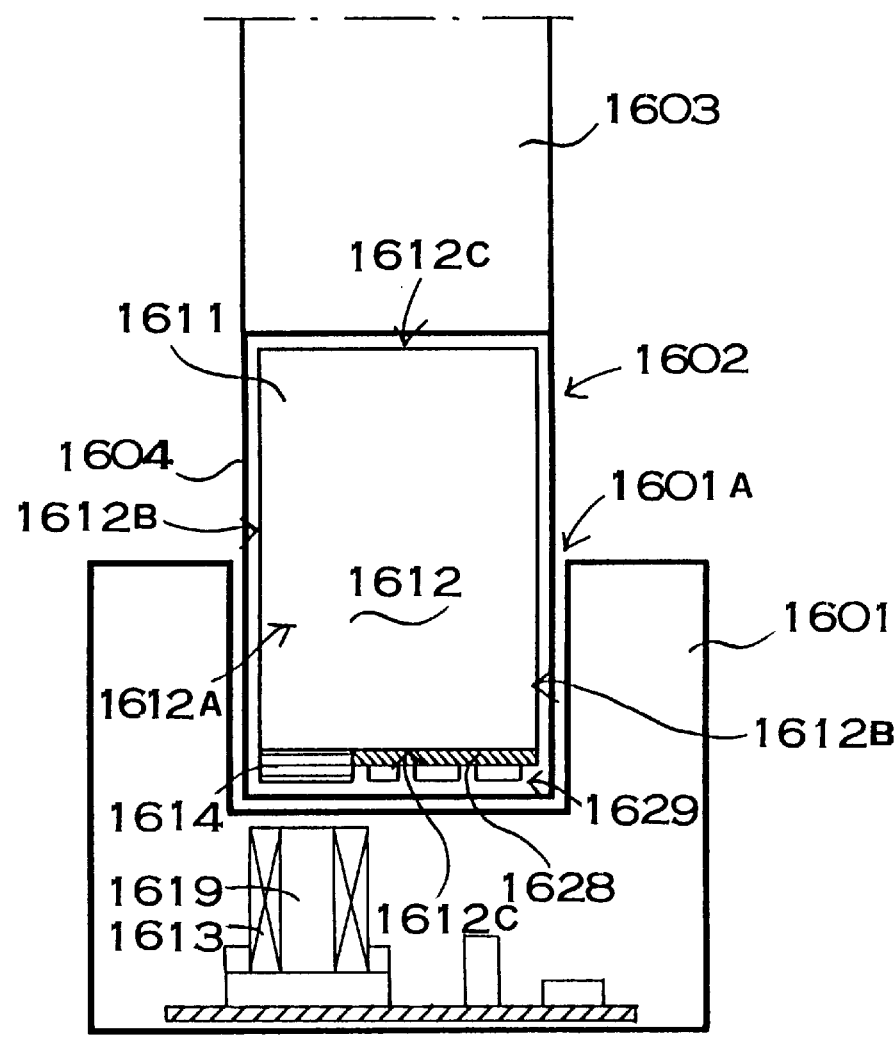
FIG. 17 is a vertical cross-section of the charging stand and battery pack attached to that charging stand shown in FIG. 16.

A battery pack may also attach to a charging stand 1601 in the configuration shown in FIGS. 16 and 17. The battery pack 1602 in these figures attaches in a detachable manner to the backside of a portable electric device 1603, and is attached to the charging stand 1601 via the portable electric device 1603.

In a battery pack containing a secondary coil, it is necessary to locate the secondary coil close to the rechargeable batteries. This is because both the secondary coil and the rechargeable batteries are housed in a small battery pack. The induced electric power of a secondary coil housed in this fashion is affected by surrounding metal, namely the outer case of a rechargeable battery. This is because the rechargeable battery outer case changes the magnetic flux produced by the primary coil.

Figure 7:
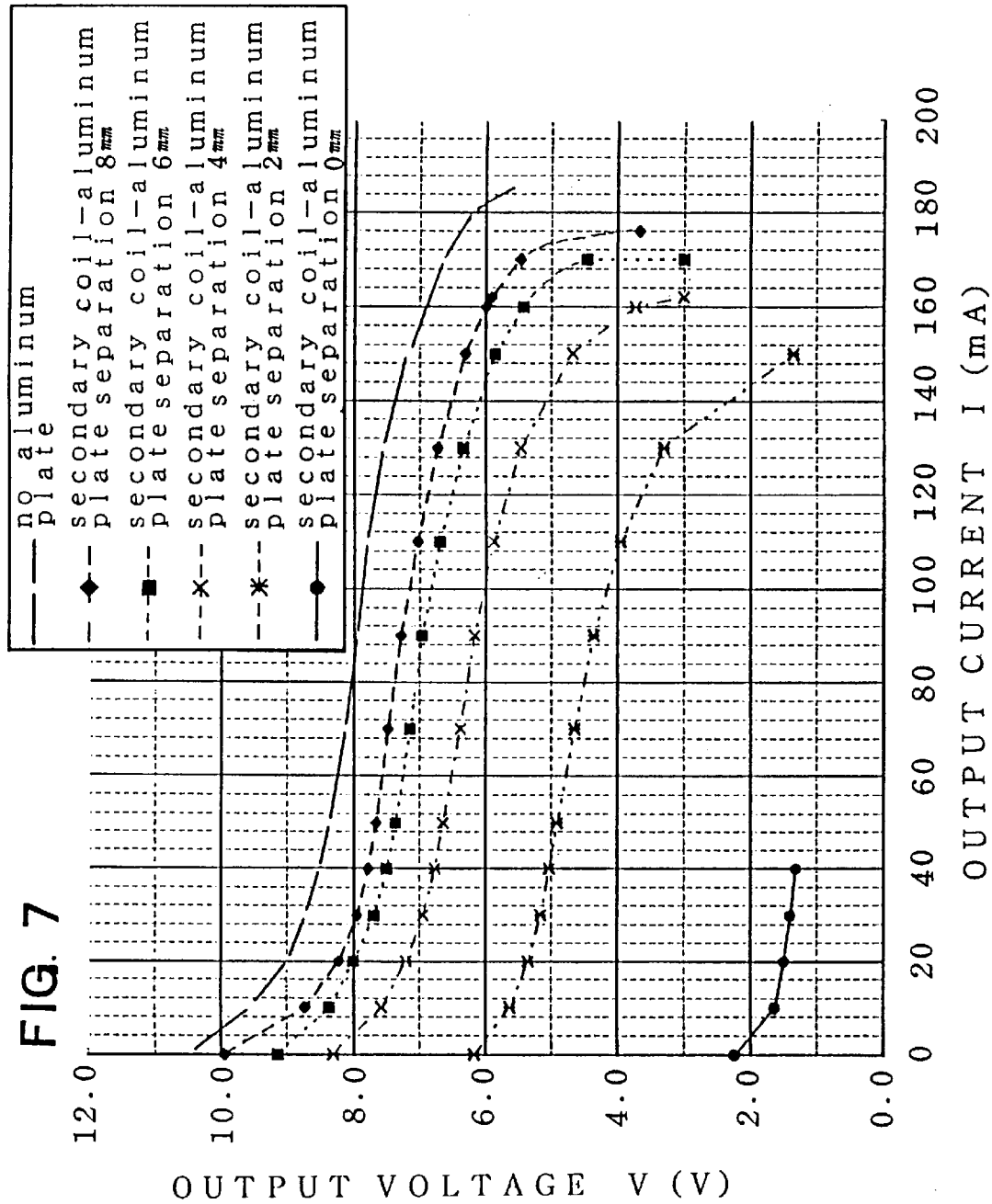
FIG. 7 is a graph showing the current-voltage characteristics of a secondary coil disposed close to an aluminum plate.
Figure 8:
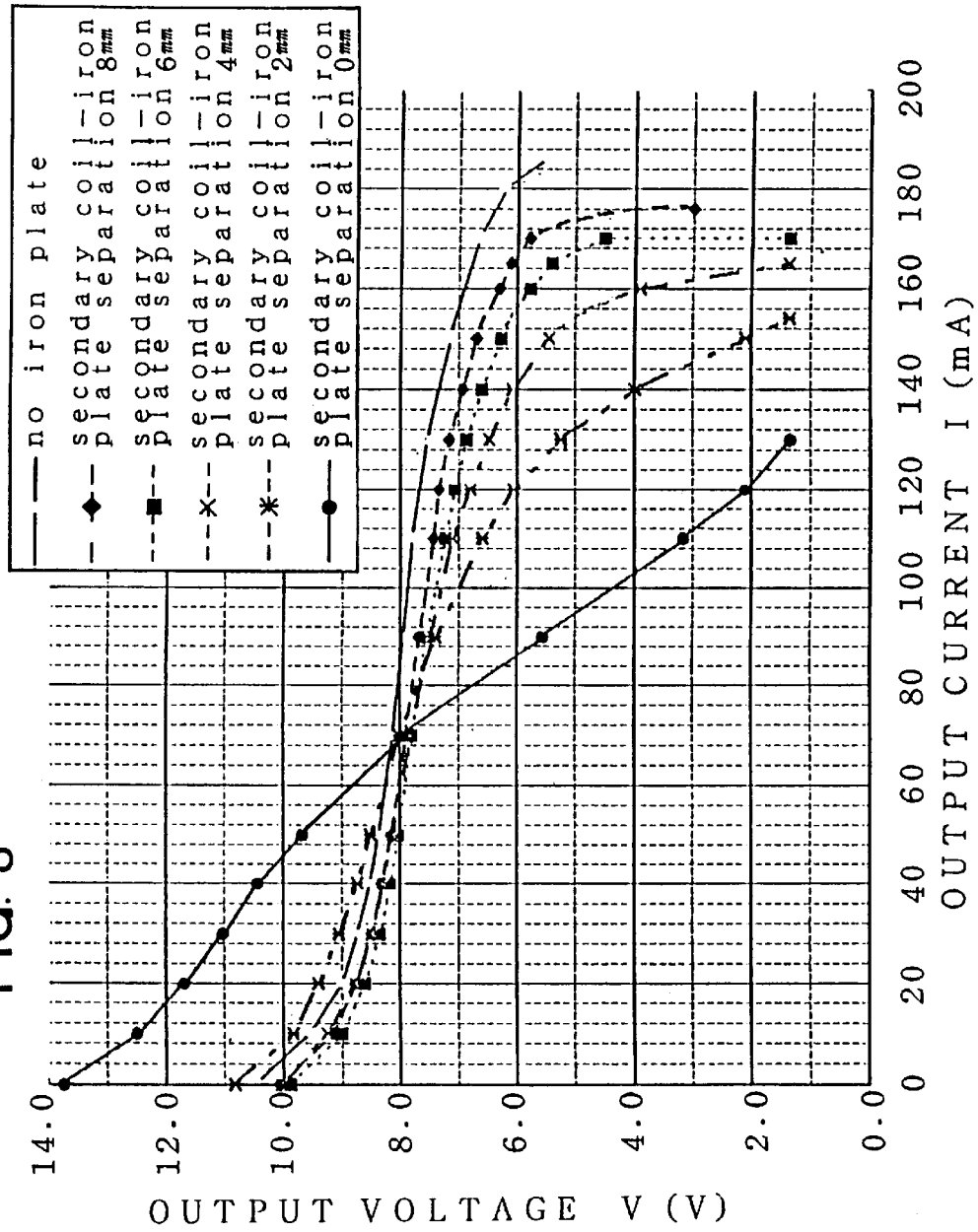
FIG. 8 is a graph showing the current-voltage characteristics of a secondary coil disposed close to an iron plate.

A battery pack typically houses rechargeable batteries with aluminum outer cases for an overall light weight battery pack. However, if the secondary coil is disposed close to an aluminum outer case, the electric power capable of being transmitted from the primary coil to the secondary coil is drastically reduced. FIG. 7 shows the effects of an aluminum plate, which is disposed close to the secondary coil, on the current-voltage characteristics of the secondary coil, which is located parallel and close to the primary coil. FIG. 8 shows the secondary coil current-voltage characteristics measured under the same conditions with the aluminum plate replaced by an iron plate.

Data for these figures were measured under the following conditions.

(1) The primary coil and driving circuit were cordless telephone part TDK MSE177E.

(2) The secondary coil was cordless telephone part TDK MSE177F.

(3) 141 V DC switched to AC with a frequency of 120 kHz was applied to the primary coil.

(4) The gap between the primary coil and the secondary coil was 4 mm.

(5) Output from the secondary coil was rectified with diodes (RK33) and smoothed with a smoothing capacitor (200 mF).

(6) An aluminum plate or iron plate was disposed parallel and close to the secondary coil on the side opposite the primary coil.

(7) The aluminum or iron plate was 2 mm thick with a width and length of 30 mm by 50 mm. The primary and secondary coil outer winding outline was approximately 20 mm by 30 mm, and the coils were located at the center of the aluminum or iron plate.

(8) The gap between the aluminum or iron plate and the secondary coil was varied from 0 to 8 mm, and the current and voltage induced in the secondary coil were measured.

As shown clearly in FIGS. 7 and 8, for the same load current, output voltage is considerably lower for the secondary coil close to an aluminum plate than for the secondary coil close to an iron plate. This means when the secondary coil is close to a rechargeable battery with an aluminum outer case, current induced in the secondary coil drops drastically and electric power cannot be efficiently transferred to the secondary coil. Since the battery pack of the present invention employs batteries with iron (or steel) outer cases, power induced in the secondary coil can be made large compared with a battery pack containing rechargeable batteries with aluminum outer cases.

In particular, this characteristic becomes extremely obvious as the secondary coil is placed closer to the outer case. As shown by the solid line ● symbols in FIG. 7, output voltage from a secondary coil in contact with an aluminum plate shows an 80% drop compared with no aluminum plate, and is essentially unusable. To the contrary as shown by the solid line ● symbols in FIG. 8, in the region of low load current, a secondary coil in contact with an iron plate produces more output voltage than with no iron plate, and considerable power can be output. Consequently, the battery pack of the present invention, which locates the secondary coil in close proximity to a rechargeable battery with an iron outer case, has the feature that the battery pack shape is compact and the secondary coil can efficiently induce power. In a battery pack which employs an iron or iron alloy battery outer case, the outer case may be, for example, stainless steel or iron with a metal plated surface.

Figure 9:
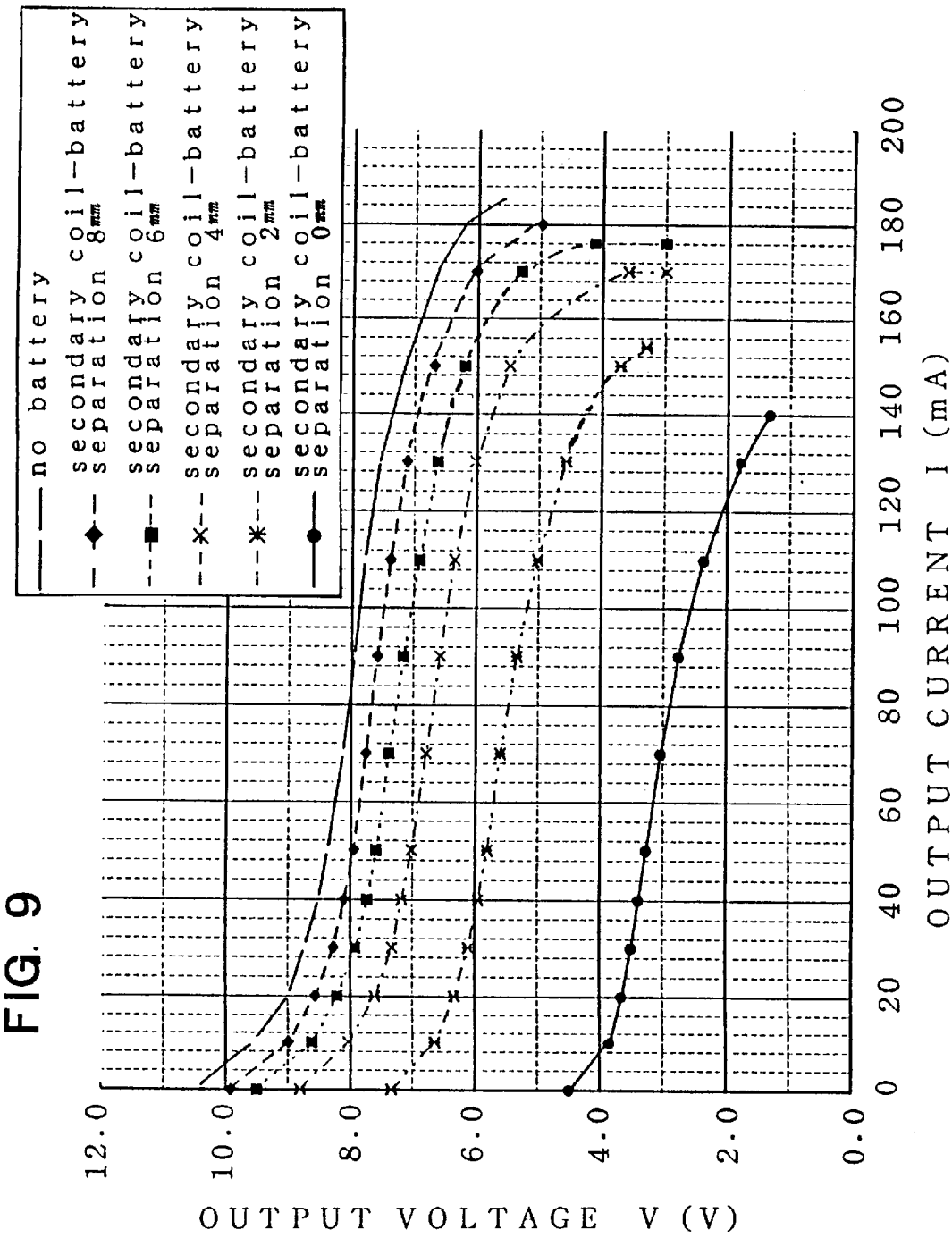
FIG. 9 is a graph showing the current-voltage characteristics of a secondary coil disposed close to the wide front or back surfaces of an aluminum outer case.
Figure 10:
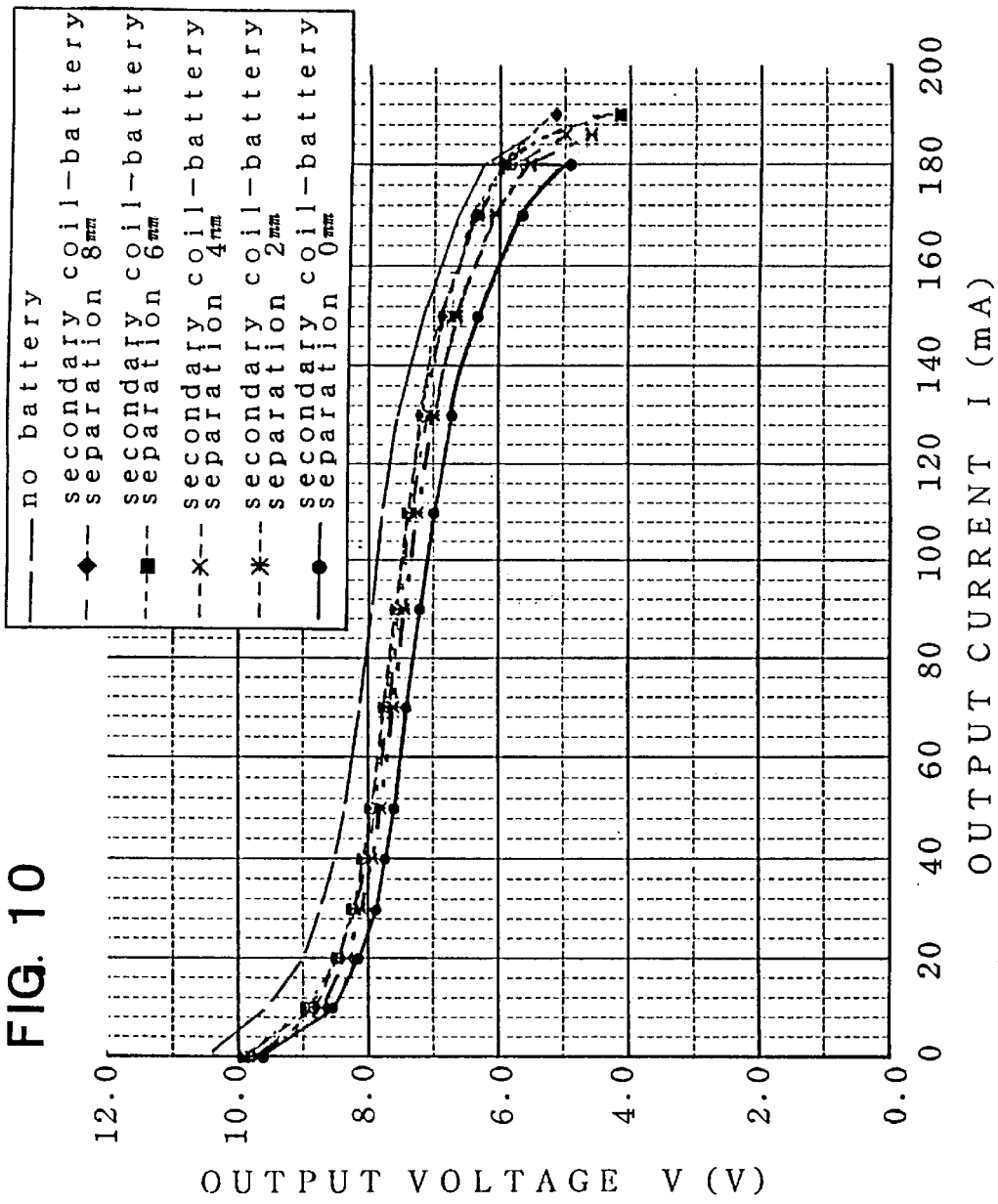
FIG. 10 is a graph showing the current-voltage characteristics of a secondary coil disposed close to the side surfaces of an aluminum outer case.
Figure 11:
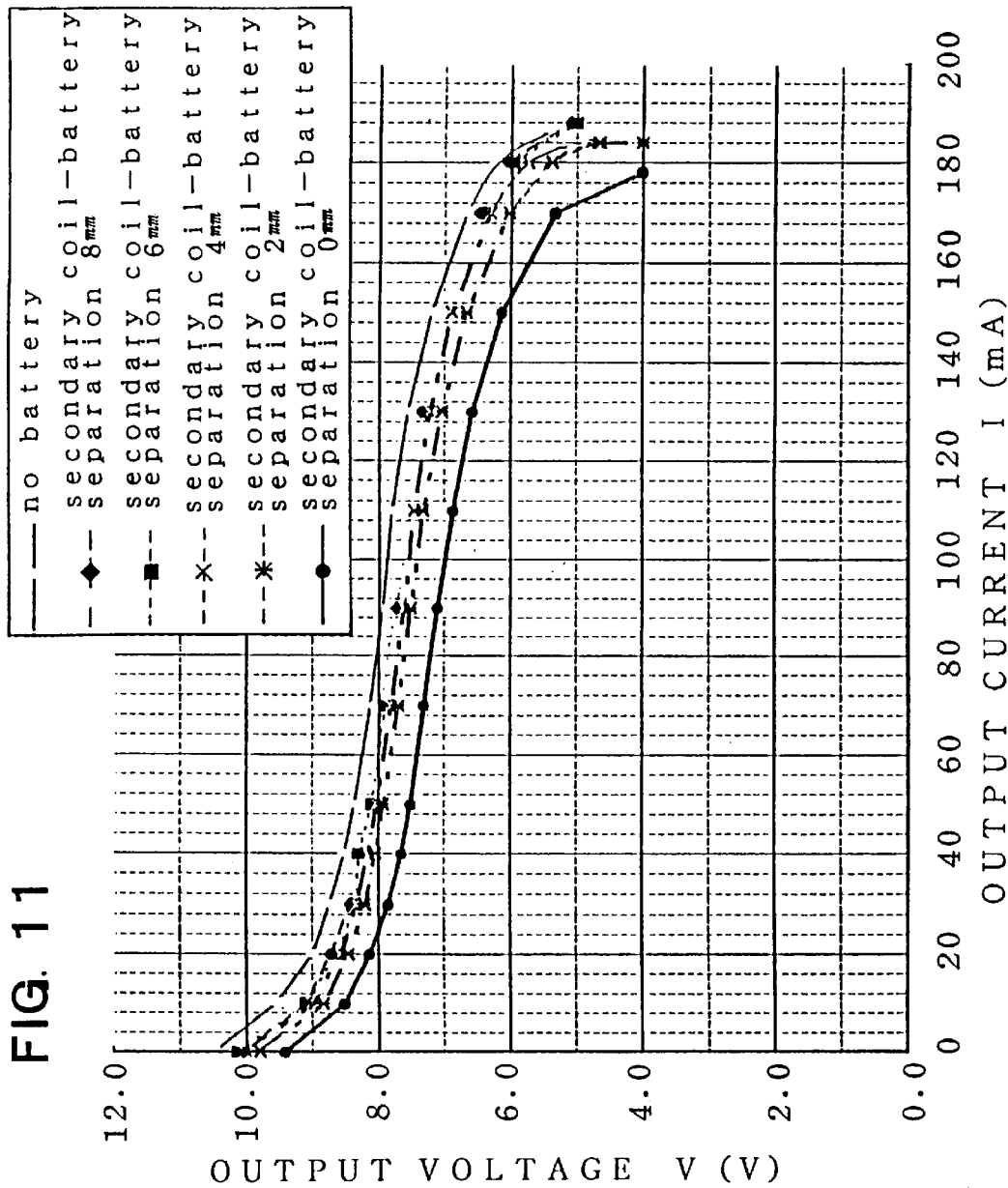
FIG. 11 is a graph showing the current-voltage characteristics of a secondary coil disposed close to the top and bottom surfaces of an aluminum outer case.
Figure 12:
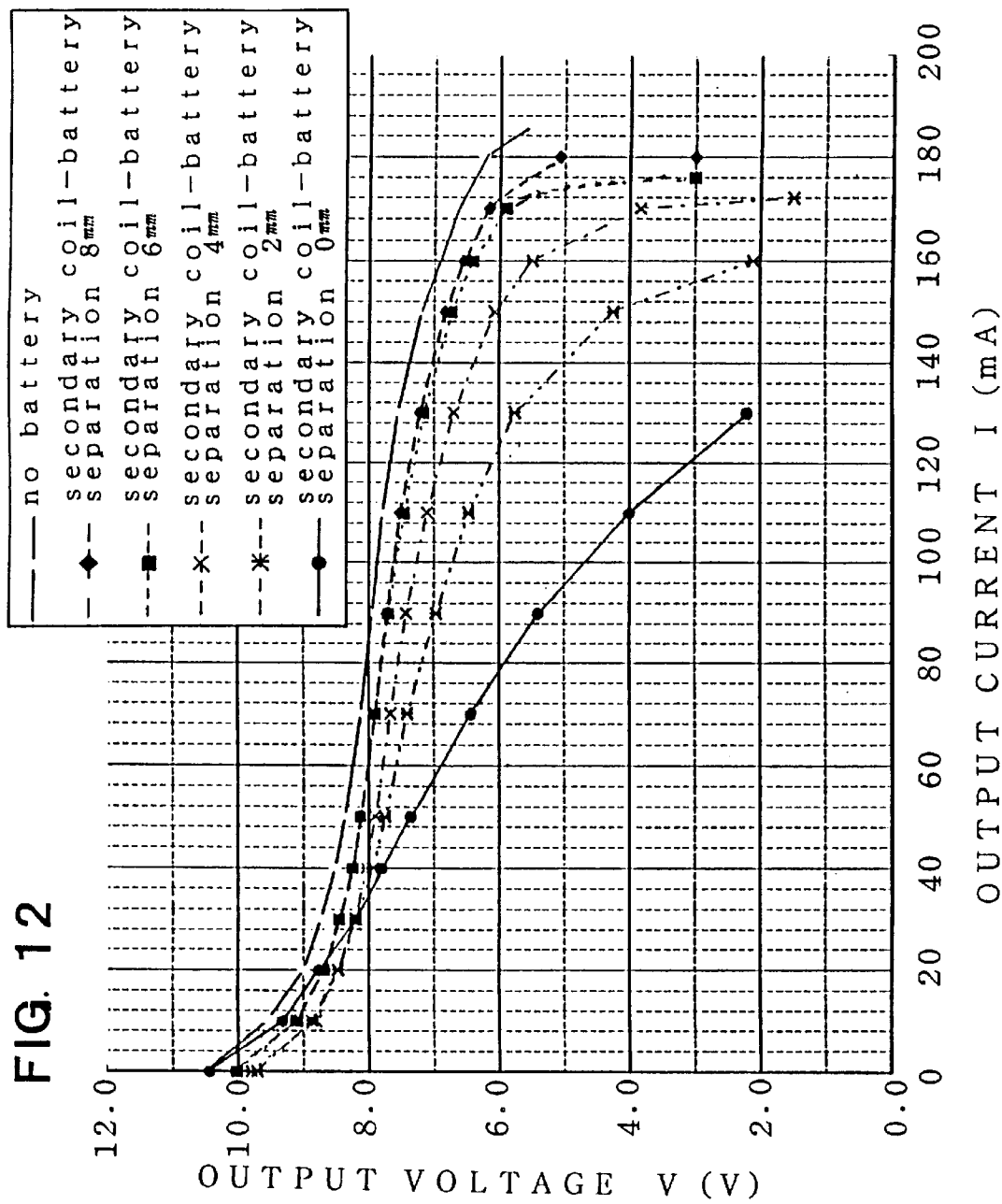
FIG. 12 is a graph showing the current-voltage characteristics of a secondary coil disposed close to the wide front or back surfaces of an iron outer case.
Figure 13:
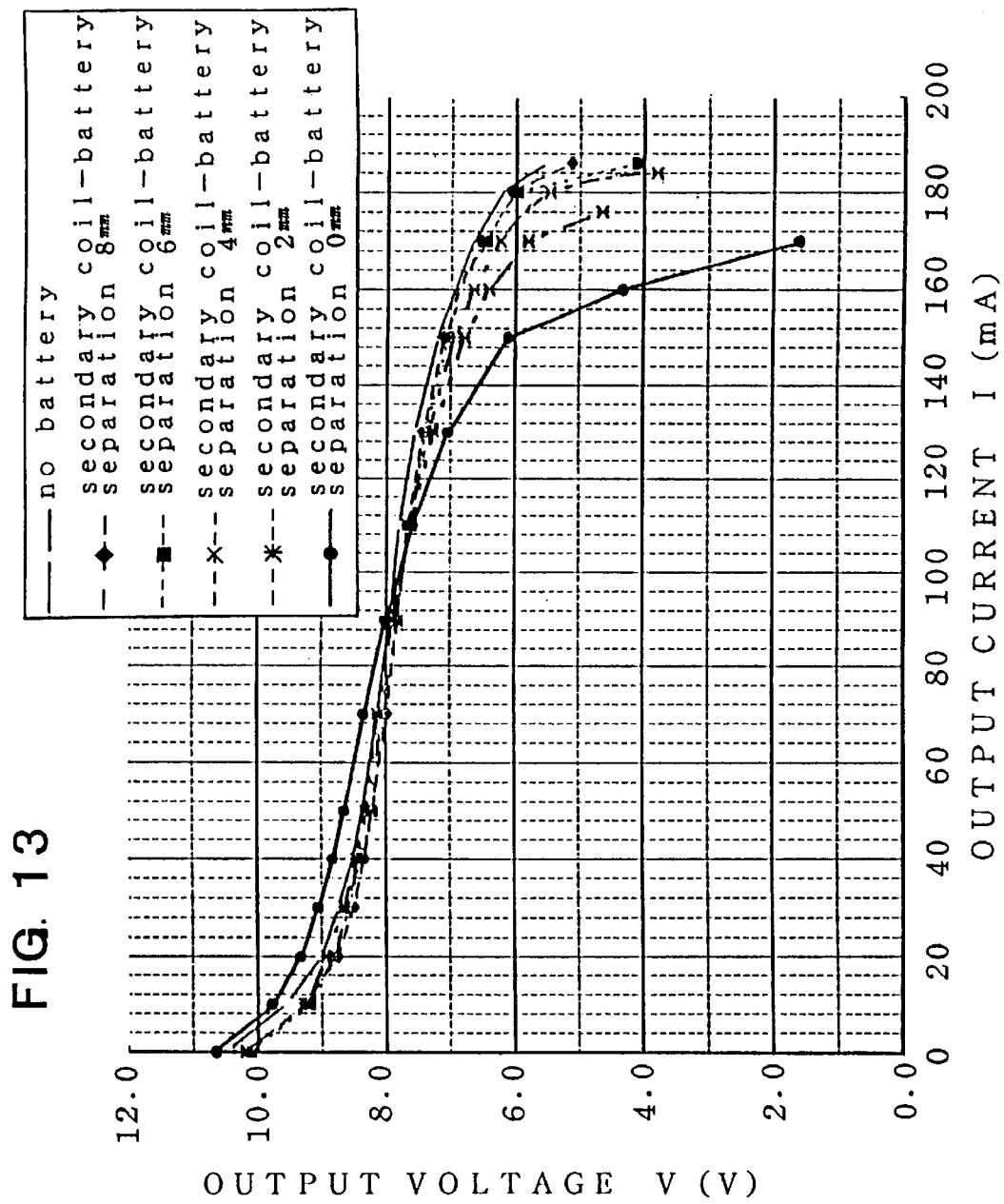
FIG. 13 is a graph showing the current-voltage characteristics of a secondary coil disposed close to the side surfaces of an iron outer case.
Figure 14:
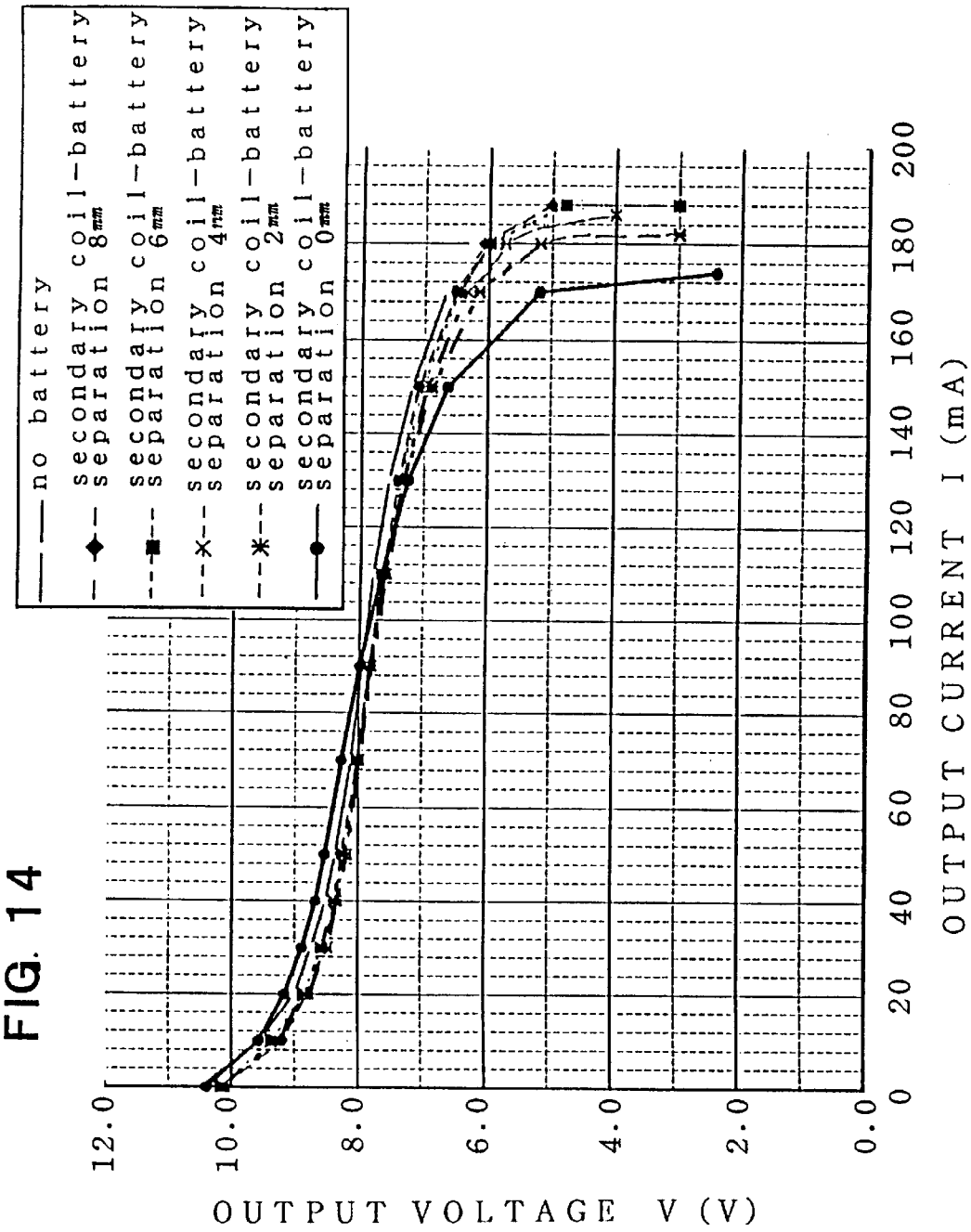
FIG. 14 is a graph showing the current-voltage characteristics of a secondary coil disposed close to the top and bottom surfaces of an iron outer case.
Figure 15:
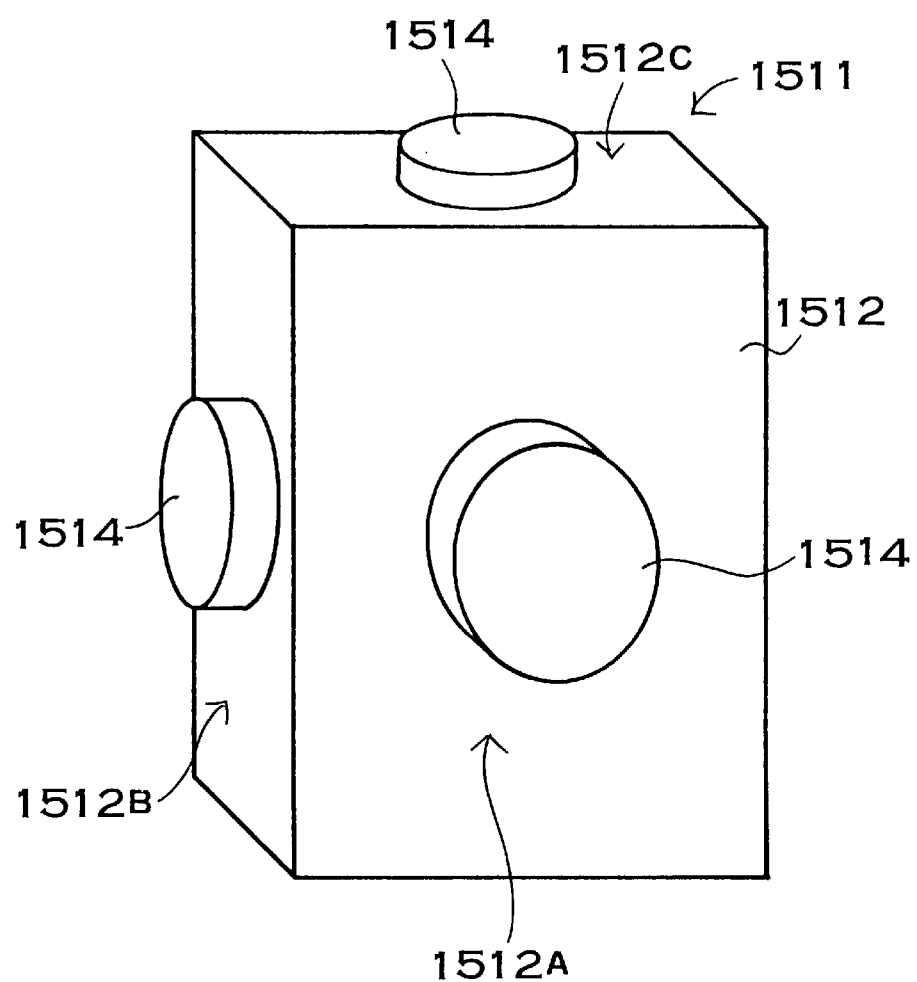
FIG. 15 is an oblique view showing secondary coil positioning close to the outer case of a rectangular rechargeable battery.

Power induced in the secondary coil of a battery pack can be increased by specifying the relative positions of the secondary coil and a rectangular shaped rechargeable battery. FIGS. 9 through 11 show current-voltage characteristics for a secondary coil located next to a rectangular rechargeable battery with an aluminum outer case. FIGS. 12 through 14 show current-voltage characteristics for a secondary coil located next to a rectangular rechargeable battery with an iron outer case. FIGS. 9 and 12 show current-voltage characteristics for secondary coil 1514 shown in FIG. 15 disposed close to a wide front or back surface 1512A of rectangular rechargeable battery 1511 outer case 1512. FIGS. 10 and 13 show current-voltage characteristics for secondary coil 1514 shown in FIG. 15 disposed close to a side wall 1512B of rectangular rechargeable battery 1511 outer case 1512. Similarly, FIGS. 11 and 14 show current-voltage characteristics for secondary coil 1514 shown in FIG. 15 disposed close to a top or bottom surface 1512C of rectangular rechargeable battery 1511 outer case 1512.

In these figures, the method of measurement used in FIGS. 7 and 8 was again used with the only exception that the aluminum plate and iron plate were replaced with an aluminum outer case rechargeable battery and an iron outer case rechargeable battery. However, rechargeable batteries with the following dimensions were used.

(1) Outer case thickness, width, and height dimensions of 8.1 mm by 22 mm by 48 mm were used for aluminum outer case rechargeable batteries.

(2) Outer case thickness, width, and height dimensions of 6.1 mm by 17 mm by 48 mm were used for iron outer case rechargeable batteries.

(3) The gap between the secondary coil and the rechargeable battery outer case was varied from 0 to 8 mm and induced current-voltage characteristics in the secondary coil were measured.

As shown in FIGS. 9 and 12, current-voltage characteristics show considerable degradation for a secondary coil located adjacent to a wide front or back surface 1512A. In particular, secondary coil current-voltage characteristic degradation increases as the secondary coil 1512 is located closer to the outer case 1512 wide front or back surface 1512A. To the contrary, as shown in FIGS. 10, 13, 11, and 14, current-voltage characteristics do not degrade much for a secondary coil adjacent to a narrow surface of the outer case, even when the secondary coil is put in close proximity with the outer case; and these current-voltage characteristics are considerably improved over those of a secondary coil adjacent to a wide front or back surface 1512A. A battery pack containing a secondary coil located close to a narrow surface can house rechargeable batteries with iron, iron alloy such as stainless steel etc. or aluminum outer cases.

Turning to FIGS. 16 and 17, a charging stand 1601 and a battery pack 1602 attached in that charging stand 1601 are shown. The battery pack 1602 in these figures attaches in a detachable manner to the backside of a portable electric device 1603, and is attached to the charging stand 1601 via the portable electric device 1603.

With the portable electric device 1603 attached in the charging stand 1601 as shown in FIGS. 16 and 17, the secondary coil 1614 contained in the battery pack 1602 case 1604 is located on the bottom surface opposite the primary coil 1613 to put it in close proximity with the primary coil 1613. To make the battery pack 1602 light weight, it is preferable for the secondary coil 1614 to have an air core (no core). However, it is also possible to provide a core in the secondary coil to allow more efficient transfer of electric power by magnetic induction from the primary coil to the secondary coil.

The battery pack 1602 shown in FIGS. 16 and 17 has the secondary coil 1614 located at the base of the rechargeable battery 1611. The secondary coil 1614 is disposed at the bottom of the case 1604 at the base of the rechargeable battery 1611. The secondary coil 1614 is disposed at the bottom of the case 1604 with its center axis in the long direction of the case 1604 and the battery, which is the vertical direction in the figures.

The case 1604 of the battery pack 1602 is plastic formed in a thin rectangular box shape which contains a rectangular rechargeable battery 1611 inside. The rectangular rechargeable battery 1611 has a rectangular outer case 1612 with a greater width than thickness. The outer case 1612 has wide front and back surfaces 1612A connected by narrow surfaces around their periphery. The narrow surfaces are the side walls 1612B which connect the wide front and back surfaces 1612A at both lateral edges, and the top and bottom surfaces 1612C which connect the wide front and back surfaces 1612A at their top and bottom edges.

The height of the rectangular case 1604 is greater than the height of the rectangular rechargeable battery 1611 providing a gap at the bottom of the rectangular case 1604. The secondary coil 1614 and the printed circuit board 1628 are disposed in this gap. The secondary coil 1614 outline and the printed circuit board 1628 width are approximately equal to the width of the rectangular rechargeable battery 1611, and they are disposed at the base of the rechargeable battery 1611. The printed circuit board 1628 is installed in a fashion that insulates it from the rechargeable battery 1611. Electronic parts 1629 which implement the control circuit and the protection circuit are attached to the printed circuit board 1628.

Figure 18:
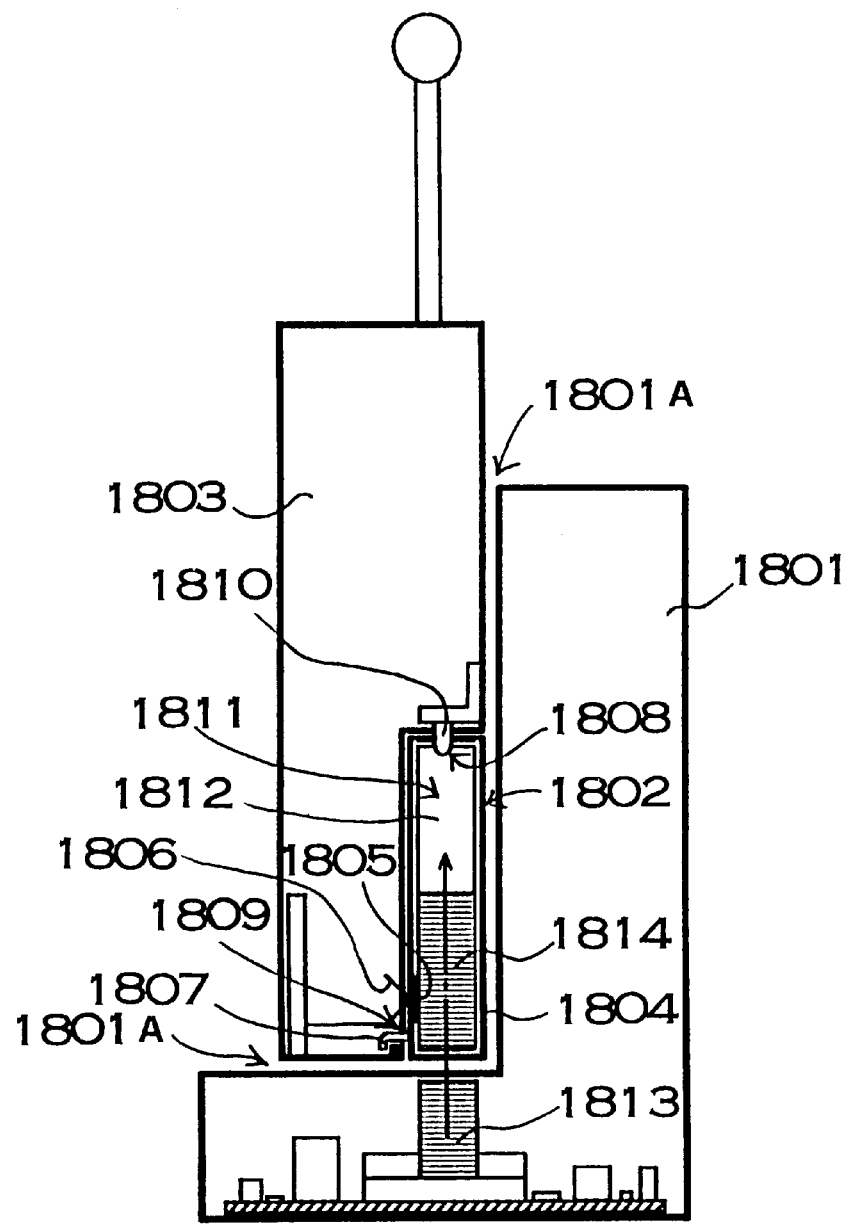
FIG. 18 is a vertical cross-section from the side of a charging stand and battery pack attached to that charging stand of another embodiment of the present invention.
Figure 19:
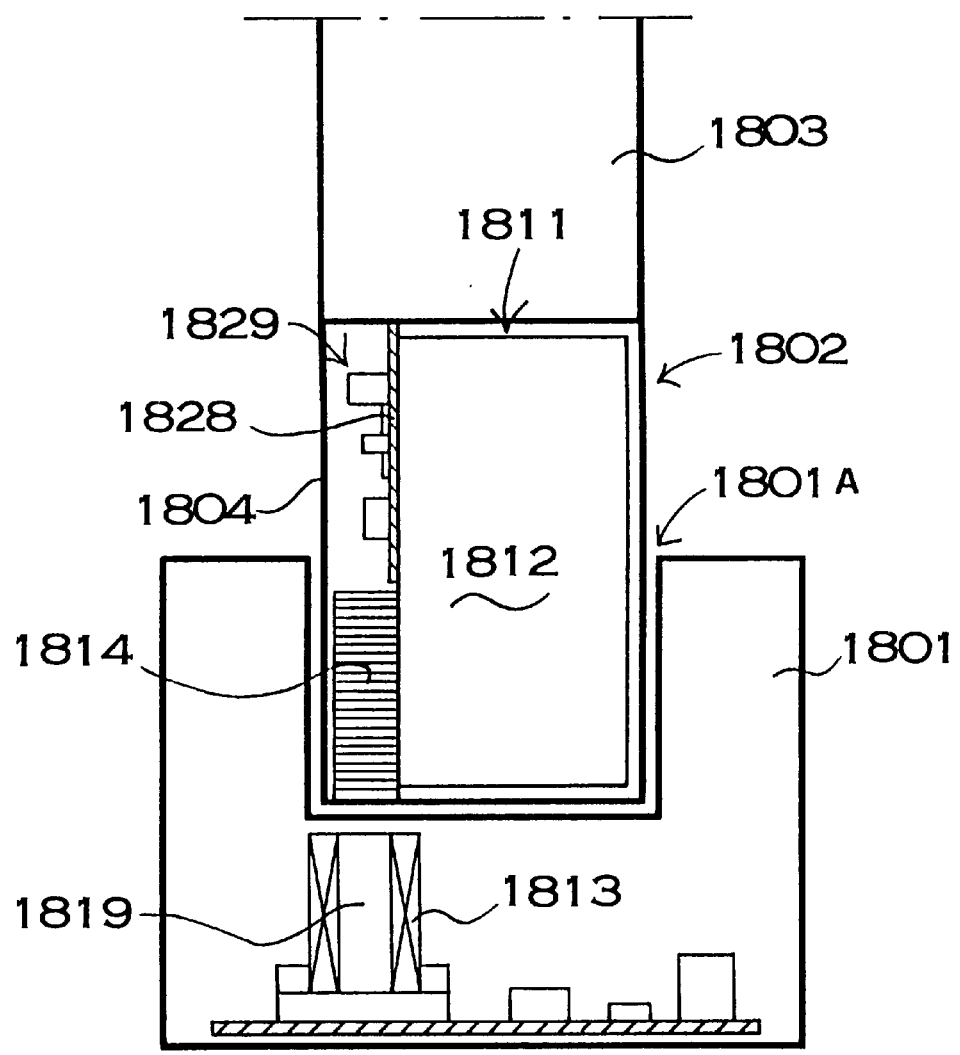
FIG. 19 is a vertical cross-section of the charging stand and battery pack attached to that charging stand shown in FIG. 18.

Next, in the battery pack 1802 shown in FIGS. 18 and 19, a rectangular rechargeable battery 1811 is housed in a rectangular case 1804 and the secondary coil 1814 is disposed to the side of the rectangular rechargeable battery 1811. The secondary coil 1814 is installed in the side of the case 1804 with its center axis in the long direction of the case 1804 and battery, which is the vertical direction in the FIGS. The width of the rectangular case 1804 is made wider than the width of the rectangular rechargeable battery 1811 creating a gap at the side of the rectangular case 1804. The secondary coil 1814 is disposed in the lower part of the gap and the printed circuit board 1828 is disposed in the upper part of the gap. The battery pack 1802 of these figures is configured similar to the battery pack shown in FIGS. 16 and 17 in that it can attach in a detachable manner to the portable electric device 1803.

Figure 20:
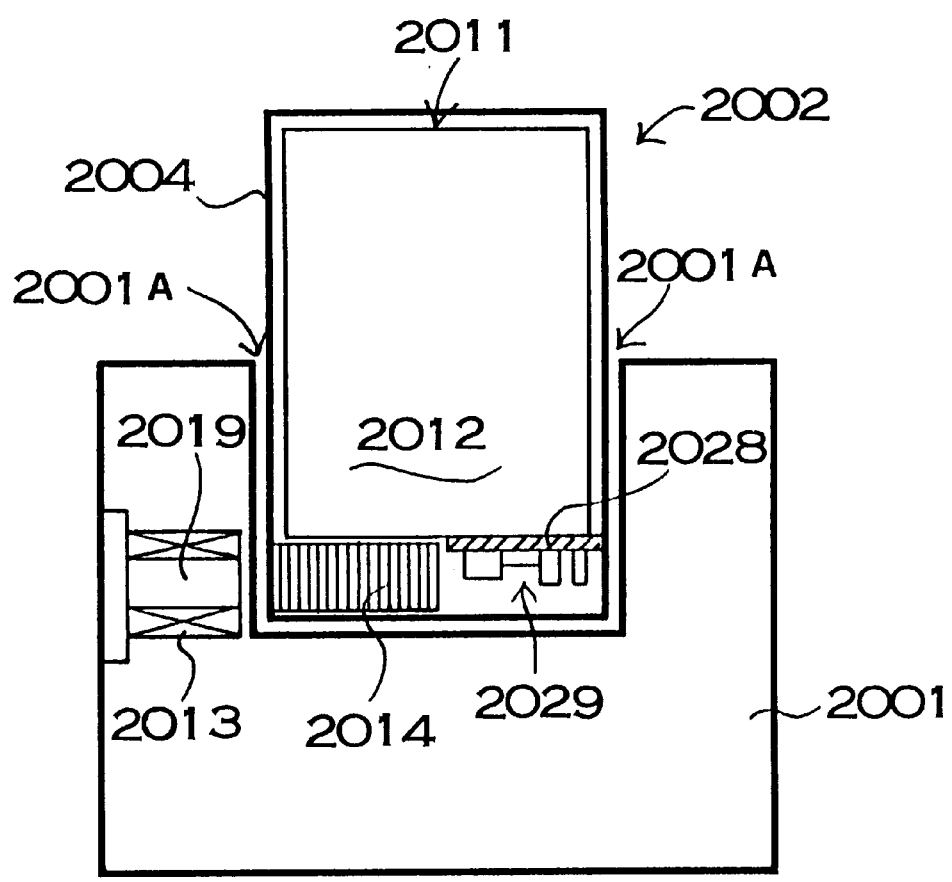
FIG. 20 is a vertical cross-sectional view of a charging stand and battery pack attached to that charging stand of still another embodiment of the present invention.

Turning to the battery pack 2002 of FIG. 20, a secondary coil 2014 and printed circuit board 2028 are disposed below the rectangular rechargeable battery 2011 in the bottom of the case 2004. The battery pack 2002 shown in this FIG. has its secondary coil 2014 installed in the base of the case 2004 with its center axis oriented in the lateral direction of the case 2004 and the battery, which is the horizontal direction in FIG. 20. The primary coil 2013 and secondary coil 2014 are installed with their center axes along a straight line. Consequently, the primary coil 2013, which transmits power to the secondary coil 2014 with this lateral orientation, is housed in the charging stand 2001 with its center axis in the lateral or horizontal direction as shown in FIG. 20.

The battery packs discussed above have secondary coils disposed close to narrow surfaces and away from the wide front and back surfaces of rectangular rechargeable batteries. This battery pack configuration can have a rectangular rechargeable battery outer case made of aluminum, aluminum alloy, iron, or iron alloy. This is because the effects of the battery outer case on the secondary coil installed in this type of battery pack can be limited.

As indicated above, a battery pack with a secondary coil disposed close to a narrow surface and away from wide front and back surfaces of the rectangular battery has the feature that the effects of the rectangular outer case of the battery can be reduced and power can be efficiently transferred from the primary coil to the secondary coil. Since the effects of the rectangular outer case of the battery can be reduced, a secondary coil disposed in these locations has the feature that power can be efficiently transferred from the primary coil to the secondary coil without restricting the outer case material to iron. For a secondary coil disposed in these locations, the battery outer case can be made of aluminum or aluminum alloy as well as iron.

Figure 21:
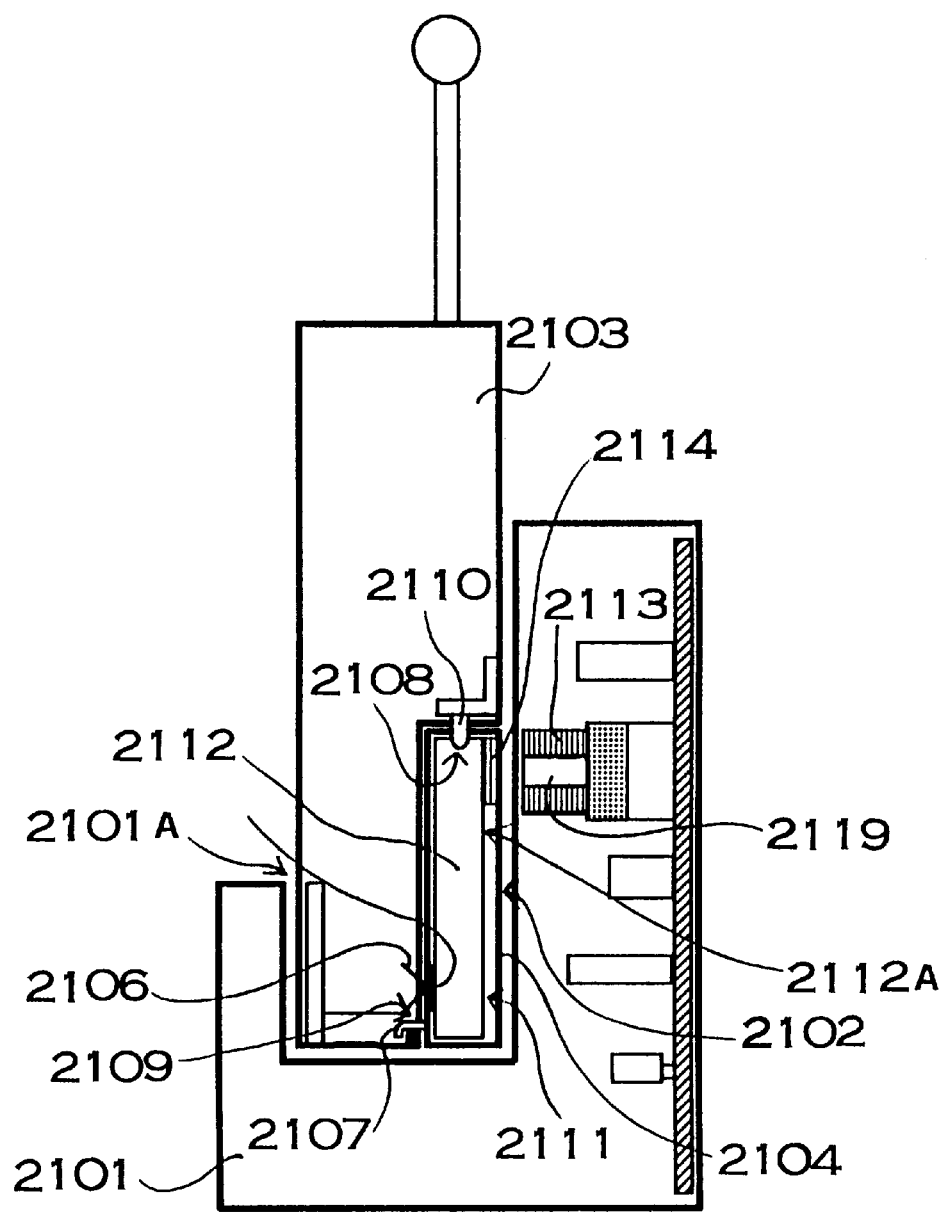
FIG. 21 is a vertical cross-sectional view of a charging stand and battery pack attached to that charging stand of even another embodiment of the present invention.

The battery pack 2102 of FIG. 21 has a secondary coil 2114 disposed close to a wide front or back surface 2112A of the rectangular rechargeable battery 2111. This battery pack 2102 has a case 2104 which is thicker than the rectangular rechargeable battery 2111, and contains a secondary coil 2114 which is close to a wide front or back surface 2112A of the rectangular rechargeable battery 2111. The secondary coil 2114 is housed within the battery pack 2102 case 2104 with its center axis oriented perpendicular to the wide front and back surface 2112A. The charging stand 2101 houses the primary coil 2113 in a location close to the secondary coil 2114 such that the center axes of the primary coil 2113 and the secondary coil 2114 lie in a straight line.

A battery pack 2102 with the secondary coil 2114 disposed on the wide front or back surface 2112A of the rectangular rechargeable battery 2111 contains a rechargeable battery 2111 outer case 2112 made of iron or iron alloy. This is because the outer case 2112 of the rectangular rechargeable battery 2111 affects the induction of electric power in the secondary coil 2114, and if the outer case 2112 were made of aluminum or aluminum alloy, the current-voltage characteristics of the secondary coil 2114 output would be degraded. It is appropriate to use an iron battery outer case 2112 with metal plating such as nickel or chrome to avoid rusting. Further, for an iron alloy outer case, a metal that is not easily rusted such as stainless steel is suitable.

Returning to the battery pack 502 of FIG. 5, a cylindrical rechargeable battery 511 with an iron or iron alloy outer case 512 is housed in a cylindrical case 504. The secondary coil 514 is fixed in the bottom of the case 504. This configuration of the battery pack 502 inserts into a cylindrical holder (not illustrated) in the bottom of the portable electric device for attachment to the portable electric device, and is charged by attaching the portable electric device to the charging stand.

Each of the battery packs described above attaches to a portable electric device and is charged by attachment of the portable electric device to a charging stand. However, each of the battery packs described above can also be charged by attaching it directly to a charging stand without attachment to a portable electric device.

A battery pack as described above, which houses at least one rechargeable battery with an iron or iron alloy outer case, has the feature that electric power can be efficiently transferred from the primary coil to the secondary coil regardless of whether the secondary coil is disposed close to the rechargeable battery. In particular, electric power can be efficiently transferred from the primary coil to the secondary coil when the secondary coil is disposed on a wide front or back surface of a rectangular rechargeable battery where the magnetic field is easily affected.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims or equivalents of such metes and bounds thereof are therefore intended to be embraced by the claims.

What is claimed is:

1. A battery pack comprising:

at least one rechargeable battery;

a case containing the rechargeable battery;

a secondary coil which is housed in the case, is excited externally and outputs AC;

a control circuit which controls electric power induced in the secondary coil and charges the rechargeable battery contained in the case; and a printed circuit board having the secondary coil attached to one side thereof and electronic parts which make up the control circuit attached to the other side thereof.

2. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case; and a printed circuit board having the secondary coil and electronic parts which make up the control circuit attached to one side thereof.

3. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case;

a protection circuit; and a switching device, which is turned from on to off by the control circuit when the rechargeable battery reaches full charge, serving the dual purpose as a current shut-off device for the protection circuit.

4. A battery pack comprising:

at least one rechargeable battery;

a case containing the rechargeable battery:

a secondary coil which is housed in the case, is excited externally, and outputs AC;

a control circuit which controls electric power induced in the secondary coil and charges the rechargeable battery contained in the case; and wherein the case contains the control circuit and a protection circuit, the control circuit comprises a computation circuit, and the computation circuit of the control circuit serves the dual purpose as a computation circuit for the protection circuit.

5. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case; and wherein an outer case of the rechargeable battery contained in the battery pack is made of iron or iron alloy.

6. A battery pack as recited in claim 5 wherein the outer case of the rechargeable battery contained in the battery pack is made of stainless steel.

7. A battery pack as recited in claim 5 wherein the outer case of the rechargeable battery contained in the battery pack is made of iron with a metal plated outside surface.

8. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable batter contained in the case;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of aluminum or aluminum alloy.

9. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of iron or iron alloy.

10. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the rectangular battery is made of stainless steel.

11. A battery pack comprising:

at least one rechargeable battery;

a case containing the rechargeable battery;

a secondary coil which is housed in the case, is excited externally, and outputs AC;

a control circuit which controls electric power induced in the secondary coil and charges the rechargeable battery contained in the case;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of iron with a metal plated outside surface.

12. A battery pack and charging stand comprising:

a battery pack case which is attachable to a portable electric device in a detachable manner;

at least one rechargeable battery contained in the battery pack case;

a secondary coil which is housed in the battery pack case, is excited externally and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction; and a printed circuit board having the secondary coil attached to one side thereof and electronic parts which make up the control circuit attached to the other side thereof.

13. A battery pack and charging stand comprising:

a battery pack case which is attachable to a portable electric device in a detachable manner;

at least one rechargeable battery contained in the battery pack case:

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction; and a printed circuit board having the secondary coil and electronic parts which make up the control circuit attached to one side thereof.

14. A battery pack and charging stand comprising:

a battery pack case which is attachable to a portable electric device in a detachable manner;

at least one rechargeable battery contained in the batter pack case;

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction;

a protection circuit; and a switching device, which is turned from on to off by the control circuit when the rechargeable battery reaches full charge, serving the dual purpose as a current shut-off device for the protection circuit.

15. A battery pack and charging stand comprising:

a battery pack case which is attachable to a portable electric device in a detachable manner;

at least one rechargeable battery contained in the battery pack case;

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction; and wherein the case contains the control circuit and a protection circuit, the control circuit comprises a computation circuit, and the computation circuit of the control circuit serves the dual purpose as a computation circuit for the protection circuit.

16. A battery pack and charging stand comprising:

a battery pack case which is attachable to a portable electric device in a detachable manner;

at least one rechargeable battery contained in the battery pack case;

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction; and wherein an outer case of the rechargeable battery contained in the battery pack case is made of iron or iron alloy.

17. A battery pack and charging stand as recited in claim 16 wherein the outer case of the rechargeable battery contained in the battery pack case is made of stainless steel.

18. A battery pack and charging stand as recited in claim 16 wherein the outer case of the rechargeable battery contained in the battery pack case is made of iron with a metal plated outside surface.

19. A battery pack and charging stand comprising:

a battery pack case which is attachable to a portable electric device in a detachable manner;

at least one rechargeable battery contained in the battery pack case;

a secondary coil which is housed in the battery pack case, is excited externally, and outputs AC;

a control circuit which controls electric power induced in the secondary coil and charges the rechargeable batter contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of aluminum or aluminum alloy.

20. A battery pack and charging stand comprising:

a batter pack case which is attachable to a portable electric device in a detachable manner;

at least one rechargeable battery contained in the battery pack case;

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the rectangular battery; and wherein the outer case of the rectangular battery is made of iron or iron alloy.

21. A battery pack and charging stand comprising:

a battery pack case which is attachable to a portable electric device in a detachable manner;

at least one rechargeable battery contained in the battery pack case;

a secondary coil which is housed in the battery pack case, is excited externally, and outputs AC;

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of stainless steel.

22. A battery pack and charging stand comprising:

a battery pack case which is attachable to a portable electric device in a detachable manner;

at least one rechargeable battery contained in the battery pack case;

a secondary coil which is housed in the battery pack case, is excited externally and outputs AC:

a control circuit which controls electric power induced in the secondary coil and charges the rechargeable battery contained in the battery pack case;

a charging stand case in which the portable electric device, which has a battery pack attached, is attachable in a detachable manner;

a primary coil which is housed in the charging stand case, is excited by AC, and generates AC in the secondary coil by magnetic induction;

wherein the at least one rechargeable battery has a rectangular cross-sectional shape and a width greater than its thickness, an outer case of the battery has wide front and back surfaces and narrow surfaces on both sides and on the top and bottom, and the secondary coil is disposed close to the narrow surfaces and away from the wide front and back surfaces of the outer case of the battery; and wherein the outer case of the battery is made of iron with a metal plated outside surface.

* * * * *